A. W. ROBINSON.
FLOATING DISCHARGE PIPE FOR HYDRAULIC DREDGES.
APPLICATION FILED JULY 12, 1913.
1,104,275.
Patented July 21, 1914.
2 SHEETS—SHEET 1.
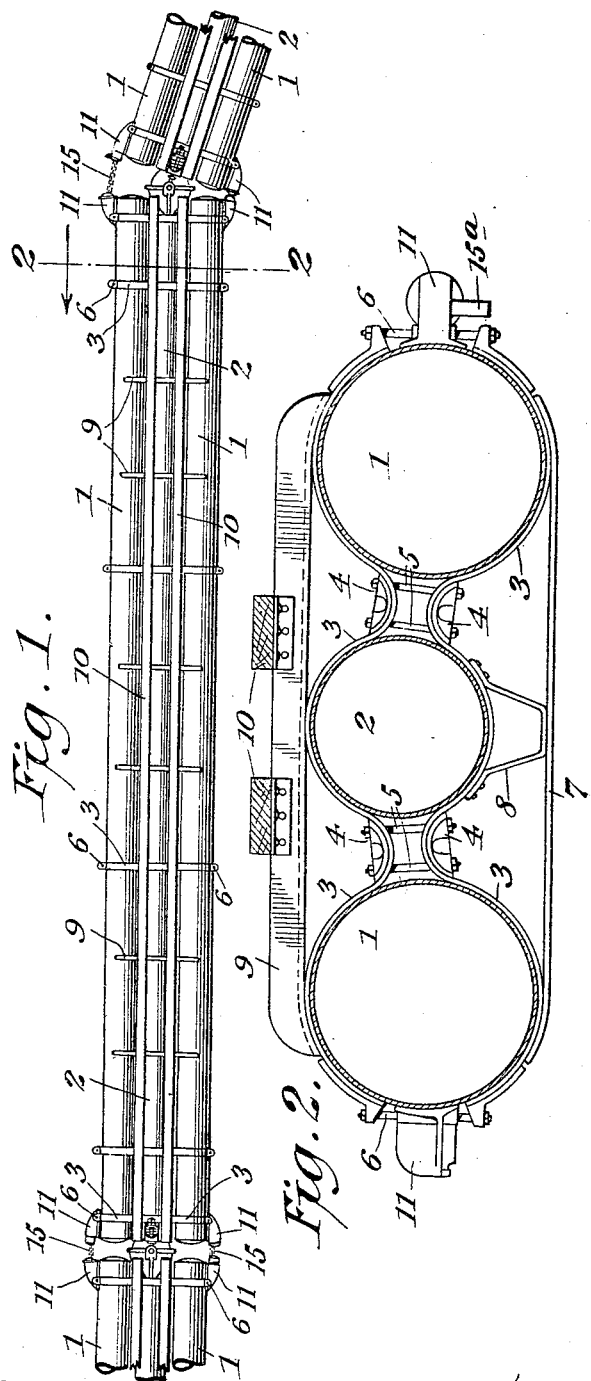
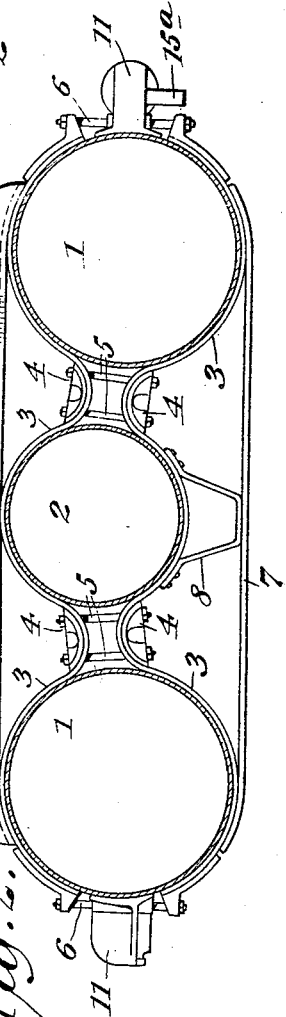
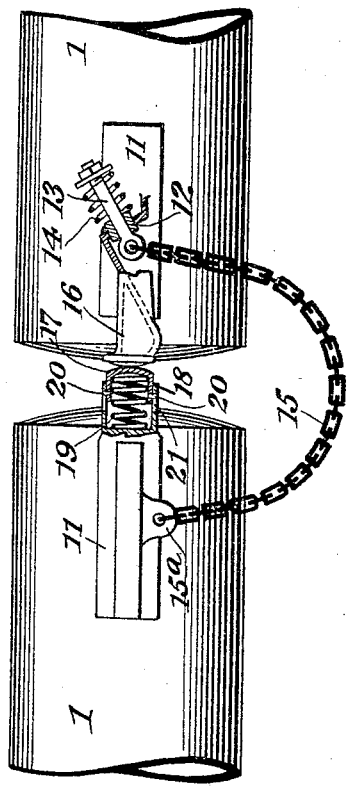
Witnesses:
A. R. Appleman
F. M. Douchack
Inventor.
Arthur Wells Robinson.
By his Attorney
Phillips Abbott.

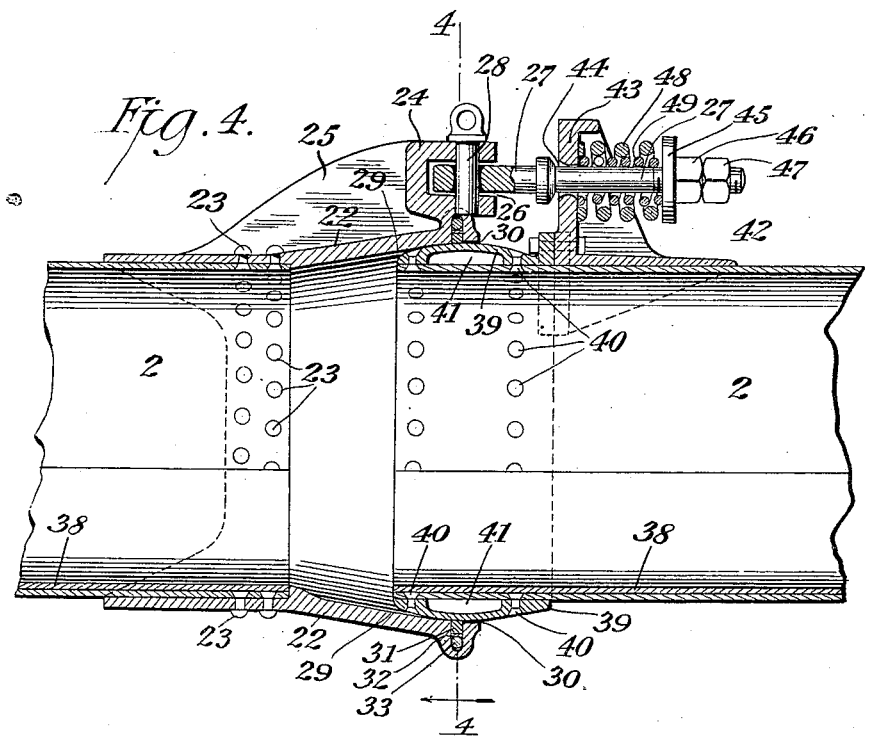
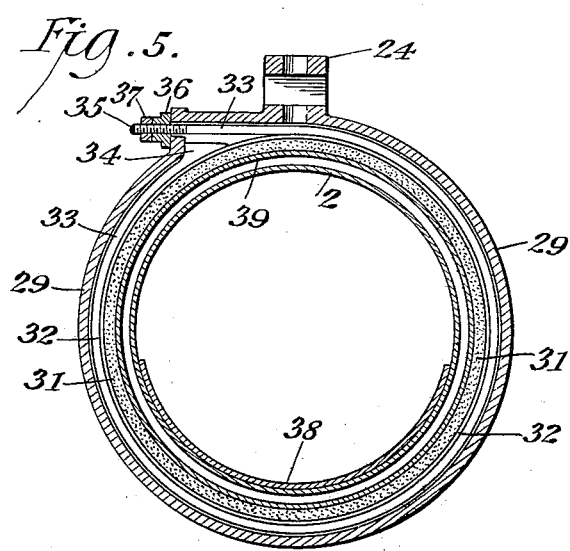

UNITED STATES PATENT OFFICE.

ARTHUR WELLS ROBINSON, OF MONTREAL, QUEBEC, CANADA.

FLOATING DISCHARGE-PIPE FOR HYDRAULIC DREDGES.

1,104,275.   Specification of Letters Patent.   Patented July 21, 1914.

Application filed July 12, 1913. Serial No. 778,644.

*To all whom it may concern:*

Be it known that I, ARTHUR WELLS ROBINSON, a citizen of the Dominion of Canada, and a resident of the city of Montreal, county of Hochelaga, Province of Quebec, Dominion of Canada, have invented certain new and useful Improvements in Floating Discharge-Pipes for Hydraulic Dredges, of which the following is a specification, reference being had to the accompanying drawings.

In apparatus of the class stated, as heretofore constructed, the discharge pipes have usually been of comparatively small size and have usually been used under conditions in which they were more or less sheltered against violent wave action and other destructive agencies, but in recent years the size and power of such apparatus have very greatly increased and the conditions under which submarine dredging is conducted are frequently such as to expose the apparatus to very inclement conditions and it has been found that to meet the requirements of the later day systems, much longer and stronger floats and discharge pipes are required than heretofore and also that the connections between the several sections or floats heretofore used have been demonstrated to be comparatively useless in view of the enormous strains that are exerted upon them by such larger apparatus.

It is the object of this present invention, therefore, to render more useful large floats and large pipes carried by them and to better adapt them to work in rough weather and to provide them with means whereby their relative movements or flexures are controlled and cushioned by elastic or non rigid devices so as to ease the strains that might otherwise cause rupture of some part and also to provide a spherical or so-called ball and socket joint connecting the separate pipe sections provided with suitable packing by means of which a non-rigid connection is obtained and leakage effectively prevented.

The above stated objects are secured by means of a suitably constructed pivotal connection between the several pipe sections and by providing the floats which support them with suitably constructed spring cushioned buffers and with certain strong chains which are likewise spring cushioned, which limit the extent to which the floats can be disalined. The ball and socket joint between the pipe sections is rendered water tight by a peculiarly constructed packing whereby the joint is rendered water tight or substantially so.

The drawings illustrate one form in which my invention may be embodied and I regard it as a useful form, inasmuch as the parts are simple and very durable in construction and efficient in operation.

Figure 1 illustrates a plan view showing one section or float with its section of discharge pipe all complete and two adjoining sections broken off; Fig. 2 illustrates a vertical sectional view on the line 2—2 of Fig. 1, looking in the direction of the arrow; Fig. 3 illustrates an elevation of the adjoining float sections; Fig. 4 illustrates a vertical sectional view showing the ends of two adjoining pipe sections; Fig. 5 illustrates an endwise vertical sectional view taken through the line 4—4 of Fig. 4 and looking in the direction of the arrow, the steel band or follower for the soft packing and the compressing rod therefor being shown in elevation.

In the drawings 1, 1, illustrate two large hollow tubes which constitute the float. Their ends are of course closed by suitable heads. 2 is the discharge pipe. These tubes and the discharge pipe supported by them are held in proper relative position to each other by heavy straps 3, 3, etc., which are made to properly encircle the float tubes and the discharge pipe by suitable clamps 4 provided with bolts 5 and tightening and clamping bolts 6, 6. These supporting devices are usually supplemented by suitable brace bars 7 which carry a series of inverted horses 8 and by transversely arranged angle iron braces 9 which support longitudinally extending timbers 10, 10. These details of construction may of course be varied as preferred.

Referring now to Fig. 3 which illustrates the details of construction of the devices which afford elastic connection between the float tubes, 11, 11, are castings firmly bolted to the outer sides of the float tubes. One of them is provided with a lug 12 through which passes a bolt 13 supported upon a spring 14. One end of the bolt is provided with an eye with which one end of a chain 15 engages, the other end connecting with a lug 15ᵃ upon the other casting 11 upon the end of the opposed float tube. When the floats are alined with each other the chains are slack and hang in a looped condition. One of these castings is provided with a buffer head 16 which normally abuts against a spring supported buffer head 17 inclosed within a suitable tubular structure 18 made on the opposite casting within which there is a buffer spring 19. The head 17 which is supported upon the spring is guided during longitudinal movement when the spring is compressed by suitable pins or projections 20 therefrom which move through slots 21 made in the sides of the tubular casing 18.

Referring to Fig. 1, it will be seen that similar parts constructed as above described are upon the outer sides of both of the tubes constituting the floats.

Referring to Figs. 4 and 5, which illustrate the ball and socket and spring cushioned connection between the ends of adjoining pipe sections, 22 is a strong annular casting very securely bolted to the lefthand discharge pipe by bolts 23 and on its upper part is a raised portion 24 having a strong forward part 25 which is recessed as at 26 so as to receive a coupling link 27 which is provided with an eye on its end through which passes a coupling pin 28, and the interior of the casting 22 at its outer part is tapered as shown at 29 so as to afford the socket for the ball about to be described which is on the opposed end of the adjoining tube. This socket is for a short distance made parallel sided or truly cylindrical as shown at 30, so as to permit slight longitudinal movement of the ball within it, without changing the relation of the parts and near the outer edge of this socket there is cut a groove as shown, within which are contained the following packing devices, a soft packing ring 31, next to it a split metallic compression ring 32 and outside of it a compressing band or rod 33 which has an enlargement 34 (see Fig. 5) at one end which engaging with the walls of the socket as shown holds that end rigidly in place, the other end after making a ring-like circuit terminating in a threaded end 35 provided with nut and jam nut 36 and 37 so that when these nuts are turned up tight, the draft upon the rod will cause the circle described by it to slightly contract and since this rod engages with and slips upon the surface of the split metallic ring or band 32, it is obvious that uniform and inward radial pressure will be brought to bear upon the soft packing 31, thus forcing it into tight contact with the outer surface of the ball which is about to be described. 38 is an inner lining which I prefer to apply throughout the tubes in their lower arc so as to take the wear. Referring to the ball construction which as stated is applied to the opposed end of the adjoining discharge pipe, it comprises a strong annular casting 39 bolted as by bolts 40 to the end of the tube. I prefer in order to reduce weight to core out a hollow space 41 in this casting as shown in Fig. 4. Its outer surface which constitutes the ball of the ball and socket joint is of course given such dimensions and contour, preferably truly spherical, as to enable it to properly co-act with the socket on the opposed end of the adjoining tube. Immediately in rear of this ball is another strong casting 42 provided with an upwardly extending plate 43 through which there is an opening 44 for the passage of the shank of the link 27 which has near its end a strong washer or abutment plate 45 and is provided with nut and set nut 46 and 47. A spring 48 encircles the shank of the link and takes a bearing against the outer surface of the plate 43 and the inner surface of the washer or abutment plate 45. I prefer to employ duplex springs, one within the other, as shown, the smaller one 49 being of less power than the outer and larger one 48. I find this improves the cushioning effect.

The operation of the apparatus is as follows: The link and pin connection between the ends of adjoining discharge pipes being superimposed over the center of the ball and socket joint, as clearly shown in Fig. 4, permits horizontal flexure to the full extent of the movement for which the joint is designed and this flexure is controlled and cushioned, thus avoiding destructive strains by the engagement of the spring buffers on the outer surfaces of the float tubes 1, 1, supplemented by the chains 15 which limit the degree of flexure; strain upon these chains is also further relieved by the cushioning spring 14 (see Fig. 3) and the strains upon the link and pin connection of the discharge pipes are cushioned by the springs 48 and 49. Furthermore slight longitudinal extension of the floats and the discharge pipes as well is permitted should strains be exerted in that direction because of the parallel or truly cylindrical portions 30, 30 of the socket through which the ball can move to such degree as may be necessary, without, however, disorganizing the structure and without materially occassioning leakage because the moment the parts are drawn together again by the action of the powerful spring or springs 48 and 49, then the packing of the ball will again effect water tight, or substantially water tight connection between the ball and its socket. This construction likewise has the further important advantage that it permits vertical flexure as well as horizontal flexure to such extent as will be necessary even in a rough seaway and that this movement may be permitted without any jamming of the parts I ream out the eye in the coupling link 27 at top and bottom as shown in Fig. 2. If the packing should at any time fail to make a satisfactorily tight joint between the ball and its socket, then by tightening up the nuts 36, 37, the packing throughout its entire circumference will be forced inwardly, thus maintaining the desired tight fit.

The compressing rod or band 33 is a very simple, inexpensive and effective means of sealing a joint of the character here presented. It will be particularly noted that my improved construction is especially valuable in ponderous apparatus of the class in question because owing to the size and weight of the floats and discharge pipes, they are seldom removed from the water after once being launched. Therefore access to their under parts is practically precluded and by my construction the coupling and uncoupling of the several floats is a very simple, inexpensive and expeditious operation because all the connecting parts are above the water line and all that is necessary is to disengage the chains 15 and lift the coupling pin 28, whereupon the several float units become entirely detached from each other and the ball and socket construction is such that the ball may be drawn out endwise from the socket without any mechanical operation whatever.

It will be obvious to those who are familiar with this art that my preferred packing devices may be substituted by joint sealing devices of other constructions. I vastly prefer that shown by me however. Also that the special construction of the floats illustrated by me is immaterial. Floats of other types or for that matter, mere pontoons having the discharge pipes superimposed upon them or any other preferred form of float or support for the discharge pipes may be employed. Also in some instances it will be advisable to provide the floats with winches, anchoring, towing and such other appliances as are sometimes found useful. Indeed in certain situations it may be essential to provide the floats with the devices mentioned or others in order to properly locate and maintain the floats and the discharge pipes in proper position to do the work required of them.

I claim:

1. In a floating discharge pipe for dredges spring cushion buffers located near the outside corners of the adjoining ends of the floats adapted to engage with each other should the floats get out of alinement and chains to limit the degree of such disalinement.

2. In a floating discharge pipe for dredges spring cushion buffers located near the outside corners of the adjoining ends of the floats adapted to engage with each other should the floats get out of alinement, chains to limit the degree of such disalinement and spring cushioning devices for the chains.

3. In a floating discharge pipe for dredges spring cushion buffers located near the outside corners of the adjoining ends of the floats adapted to engage with each other should the floats get out of alinement, chains to limit the degree of such disalinement, spring cushioning devices for the chains, and a pivotal connection between the floats comprising a link and pin connection superposed upon the upper surface of the adjoining ends of the discharge pipe sections carried by the floats.

4. A floating discharge pipe for dredges comprising a series of floats each supporting a section of discharge pipe, a pivotal connection between the floats comprising a link and pin connection superposed upon the upper surface of the adjoining ends of the discharge pipe sections, spring cushioning devices for the link, spring cushioned buffers at the lateral corners of the floats and chains to limit the disalinement of the floats.

5. A floating discharge pipe for dredges comprising a series of floats each supporting a section of discharge pipe, a pivotal connection between the floats comprising a link and pin connection imposed upon the upper surface of the adjoining ends of the sections of the discharge pipe, spring cushioning devices for the link, spring cushioned buffers at the lateral corners of the floats, chains to limit the disalinement of the floats and spring cushioning devices for the chains.

6. A floating discharge pipe for dredges comprising a series of floats each supporting a section of discharge pipe, a pivotal connection between the floats comprising a link and pin connection imposed upon the upper surface of the adjoining ends of the sections of the discharge pipe, spring cushioning devices for the link, chains to limit the disalinement of the floats and spring cushioning devices for the chains.

7. In a floating discharge pipe for dredges, spring cushioned buffers located near the outside corners of the adjoining ends of the floats adapted to engage with each other, chains to limit the degree of disalinement, discharge pipe sections carried by the floats, and a pivotal connection between the floats supported upon the discharge pipe sections, whereby the said buffers are guided into engagement with each other.

8. In a floating discharge pipe for dredges, spring cushioned buffers located near the outside corners of the adjoining ends of the floats adapted to engage with each other, chains to limit the degree of disalinement, spring cushioning devices for the chains, discharge pipe sections carried by the floats and a pivotal connection between the floats comprising a spring cushioned link and pin supported upon the discharge pipe sections, whereby the buffers are guided into proper engagement with each other and the strains reduced.

9. A floating discharge pipe for dredges comprising a series of floats, a section of discharge pipe supported upon each float, a pivotal connection between the floats comprising a link and pin connection superimposed upon the upper surface of the adjoining ends of the discharge pipe sections, spring cushioning devices for the link, spring cushioned buffers at the lateral corners of the floats, chains to limit the disalinement of the floats and spring cushioning devices for the chains.

In testimony whereof I have signed my name to this specification in the presence of two subscribing witnesses.

ARTHUR WELLS ROBINSON.

Witnesses:
E. M. CORBET,
D. S. CHRISTIE.

Copies of this patent may be obtained for five cents each, by addressing the "Commissioner of Patents, Washington, D. C."